United States Patent [19]
Han

[11] Patent Number: 6,097,756
[45] Date of Patent: Aug. 1, 2000

[54] SCALABLE INTER-CONTOUR CODING METHOD AND APPARATUS

[75] Inventor: Seok-Won Han, Seoul, Rep. of Korea

[73] Assignee: Daewoo Electronics Co., Ltd., Rep. of Korea

[21] Appl. No.: 08/908,617

[22] Filed: Aug. 7, 1997

[30] Foreign Application Priority Data

Jun. 26, 1997 [KR] Rep. of Korea ...................... 97-27561

[51] Int. Cl.[7] .................................................. H04N 7/12
[52] U.S. Cl. .......................... 375/240; 348/699; 382/243
[58] Field of Search .................................. 348/390, 413, 348/414, 416, 417, 699, 700, 402; 382/173, 181, 190, 195, 199, 232, 238, 239, 241, 242, 243, 256, 282; 375/240; H04N 7/12

[56] References Cited

U.S. PATENT DOCUMENTS 5,748,789  5/1998  Lee et al. ................................. 382/243
5,929,917  7/1999  Kim ........................................ 348/420

*Primary Examiner*—Young Lee
*Attorney, Agent, or Firm*—Anderson Kill & Olick

[57] ABSTRACT

A method for scalably inter-contour coding a video signal including a previous and a current frames, wherein each of the previous and the current frames contains a contor, first generates a predicted contour by motion estimating and compensating a previous base layer, widens the predicted contour by a predetermined threshold $D_{max}(j)$, generates (j)th primary and secondary vertices, and reconstructs a current base layer, j being 0. Thereafter, the method widens the predicted contour by the predetermined threshold $D_{max}(j+1)$, generates (j+1)st primary and secondary vertices, and updates the (j)th primary and secondary vertices. Then, the (j)th primary and secondary vertices are encoded, and encoded primary and secondary vertex information is formatted in a predetermined way. Finally, the value of j is increased by 1, and the process from widening the predicted contour by $D_{max}(j+1)$ to formatting the encoded primary and secondary vertex infromation are repeated until j becomes N, N being a positive integer.

11 Claims, 10 Drawing Sheets

2ND ENHANCEMENT LAYER L₂

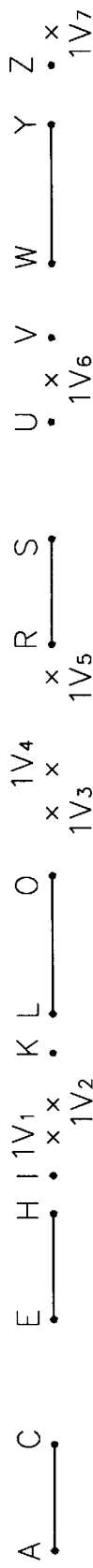
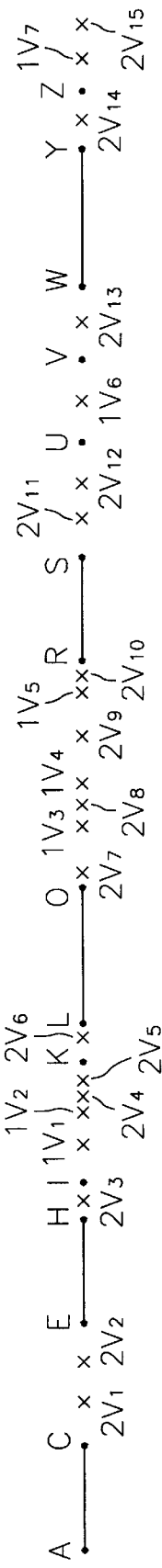
FIG.6D
FIG.6E
FIG.6F

SCALABLE INTER-CONTOUR CODING METHOD AND APPARATUS

FIELD OF THE INVENTION

The present invention relates to a method and apparatus for inter-contour coding a contour of an object in a video signal with scalability; and, more particularly, to a method and apparatus capable of sequentially improving the quality of a video image by transmitting a base layer first and enhancement layers thereafter and also capable of reducing the amount of transmission data through the use of a contour motion estimation technique.

DESCRIPTION OF THE PRIOR ART

In digital television systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is inevitable to compress or reduce the volume of data through the use of various data compression techniques, especially, in the case of such low bit-rate video signal encoders as video-telephone and teleconference systems.

One of such techniques for encoding video signals for a low bit-rate encoding system is a scalable intra-contour coding technique which is capable of sequentially improving the quality of a video image by transmitting a base layer first and enhancement layers thereafter. Generally, in order to decode an (n)th enhancement layer, lower level layers from the base layer to an (n−1)st enhancement layer are decoded in advance, wherein n is an integer greater than 2. A decoder does not decode layers from an (n+1)st layer if there is no need to improve the quality of the video image any further. In other words, a decoder decodes just as many layers as needed, thereby reducing the bit loss resulting from transmitting overly accurate or finely divided video images.

Referring to FIGS. 1A, 1B, and 1C, there are illustrated exemplary diagrams of the scalcable intra-contour coding technique. A base layer $L_0$ contains 5 vertices $P_0(1)$ to $P_0(5)$, a first enhancement layer $L_1$ contains 6 vertices $P_1(1)$ to $P_1(6)$, and a second enhancement layer $L_2$ contains 4 vertices $P_2(1)$ to $P_2(4)$. As shown in FIG. 1B, $P_1(1)$ is located between $P_0(1)$ and $P_0(2)$, $P_1(2)$ is located between $P_0(2)$ and $P_0(3)$, $P_1(3)$ is located between $P_0(3)$ and $P_0(4)$, both $P_1(4)$ and $P_1(5)$ are located between $P_0(4)$ and $P_0(5)$, and $P_1(6)$ is located between $P_0(5)$ and $P_0(1)$; and as shown in FIG. 1C, $P_2(1)$ is located between $P_0(1)$ and $P_1(1)$, $P_2(2)$ is located between $P_1(1)$ and $P_0(2)$, $P_2(3)$ is located between $P_1(4)$ and $P_1(5)$, and $P_2(4)$ is located between $P_0(5)$ and $P_1(6)$.

Meanwhile, bit streams $B_i$'s, each of which corresponds to each of the layers $L_i$'s, comprise vertex sequence information and vertex position information, wherein i is an integer ranging from 0 to 2. The bit stream $B_0$ of the base layer $L_0$ contains the vertex position information indicating the position of $P_0(1)$ to $P_0(5)$.

The bit stream $B_1$ of the first enhancement layer $L_1$ contains the vertex sequence information 1, 1, 1, 2, 1, and the vertex position information $P_1(1)$ to $P_1(6)$, wherein the vertex sequence information 1, 1, 1, 2, 1 indicates the number of vertices of the first enhancement layer $L_1$ to be inserted between two adjacent vertices of the base layer $L_0$. That is, 1 vertex is inserted between $P_0(1)$ and $P_0(2)$, 1 vertex between $P_0(2)$ and $P_0(3)$, 1 vertex between $P_0(3)$ and $P_0(4)$, 2 vertices are inserted between $P_0(4)$ and $P_0(5)$, and 1 vertex is inserted between $P_0(5)$ and $P_0(1)$; and the sequence of insertion is in the order of $P_1(1)$, $P_1(2)$, $P_1(3)$, $P_1(4)$, $P_1(5)$ and $P_1(6)$.

The bit stream $B_2$ of the second enhancement layer $L_2$ contains the vertex sequence information 1, 1, 0, 0, 0, 0, 0, 1, 0, 1, 0, and the vertex position information $P_2(1)$ to $P_2(4)$, wherein the vertex sequence information 1, 1, 0, 0, 0, 0, 0, 1, 0, 1, 0 indicates the number of vertices of the second enhancement layer $L_2$ to be inserted between two adjacent vertices of the base layer $L_0$ and the first enhancement layer $L_1$. That is, 1 vertex is inserted between $P_0(1)$ and $P_1(1)$, 1 vertex is inserted between $P_1(1)$ and $P_0(2)$, no vertex is inserted between $P_0(2)$ and $P_1(2)$, and so on; and the sequence of insertion is in the order of $P_2(1)$, $P_2(2)$, $P_2(3)$, and $P_2(4)$.

As shown in FIGS. 1A, 1B, and 1C, the shape of a restored video image becomes closer to an original shape of a contour as more layers are decoded.

Although the scalable intra-contour coding technique is capable of reducing a bit loss resulting from transmitting an overly accurate or sequented video image, it does not take into account the temporal redundancy between two consecutive frames. Thus, it still remains desirable to further reduce the volume of transmission data through the use of a contour motion estimation technique in order to more effectively implement a low-bit rate codec system having, e.g., a 64 kb/s transmission channel bandwidth.

SUMMARY OF THE INVENTION

It is, therefore, a primary object of the invention to provide an improved contour encoding method and apparatus with scalability for inter-contour coding contour information to thereby sequentially enhance the quality of a video image and further reduce the volume of transmission data.

In accordance with the present invention, there is provided a method for scalably inter-contour coding a video signal having of a previous and a current frames, wherein each of the previous and current frame contains a contour, the method comprising the steps of : generating a predicted contour by motion estimating and compensating a previous base layer; widening the predicted contour as much as a predetermined threshold $D_{max}(j)$; generating (j)th primary and secondary vertices; reconstructing a current base layer; widening the predicted contour as much as a predetermined threshold $D_{max}(j+1)$; generating (j+1)st primary and secondary vertices; updating the (j)th primary and secondary vertices. Then, the (j)th primary and secondary vertices are encoded; and the encoded primary and secondary vertex information is formatted in a predetermined way. Finally, the value of j is increased by 1, and steps for widening the predicted contour as much as $D_{max}(j+1)$ to steps for formatting the encoded primary and secondary vertex information are repeated until j becomes N, N being a positive integer.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1A:
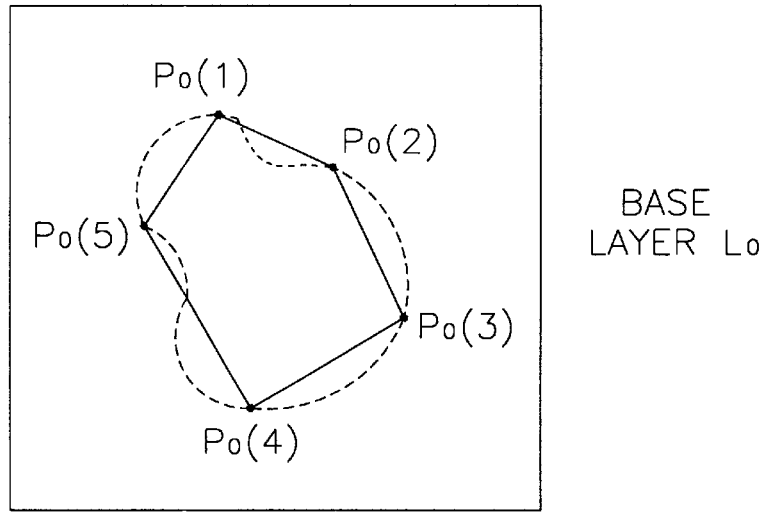
FIGS. 1A, 1B, and 1C illustrate exemplary diagrams of a conventional scalable intra-contour coding technique.
Figure 1B:
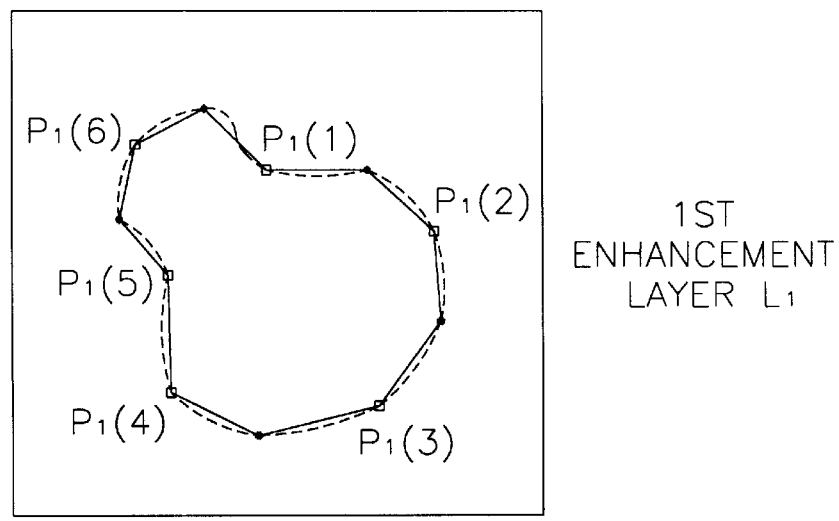
Figure 1C:
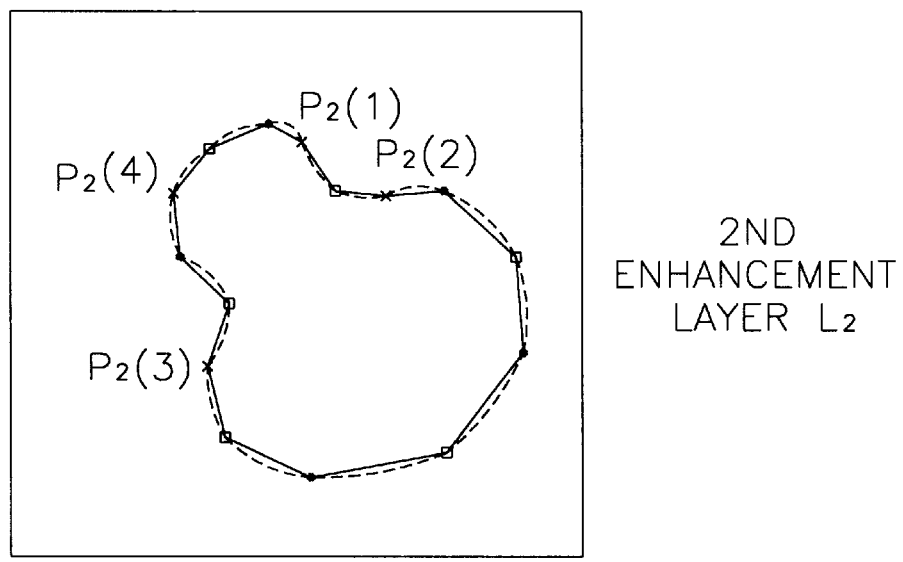
Figure 2:
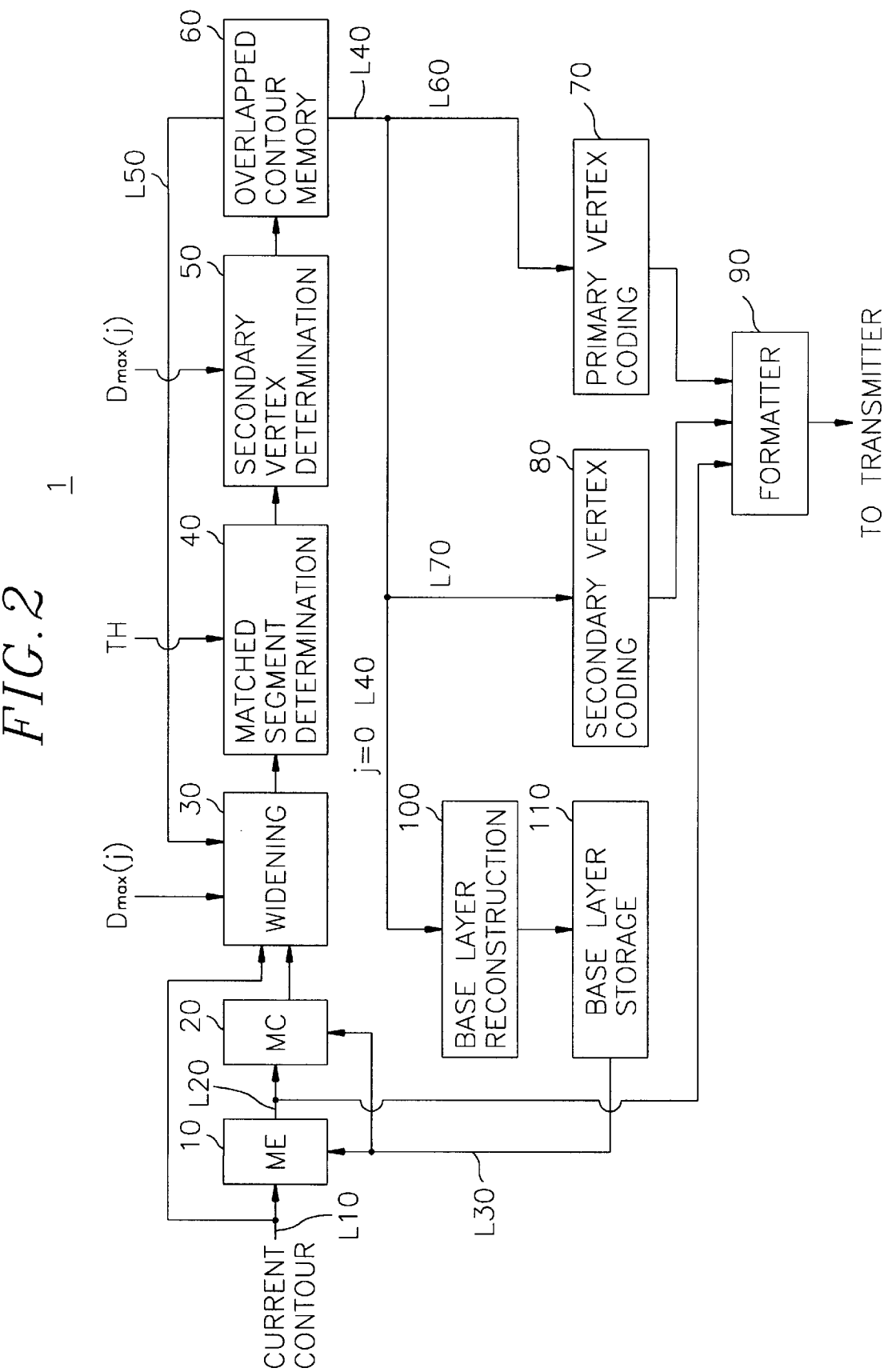
FIG. 2 shows a block diagram of an apparatus for scalably inter-contour coding in accordance with a preferred embodiment of the present invention.

Referring to FIG. 2, there is shown a block diagram of an apparatus 1 for encoding a contour in accordance with the present invention.

Current contour data on a line L10 is provided to a motion estimation unit 10 and a widening unit 30. The motion estimation unit 10 determines a motion vector MV by motion estimation. In a preferred embodiment of the present invention, a previous base layer is displaced on a pixel-by-pixel basis to thereby overlap with the current contour, and the pixels which belong to both of the current contour and the previous base layer are counted at each displacement.

Thereafter, the displacement of the previous base layer which yields a largest number of pixels which belong to both of the current contour and the previous base layer is selected as the motion vector MV. The motion vector MV on a line L20 is provided to a motion compensation unit 20 and a formatter 90.

The motion compensation unit 20 generates a predicted contour. That is, all the pixels on the previous base layer are moved in the direction of the current contour by the motion vector MV to thereby generate the predicted contour. The predicted contour is provided to the widening unit 30.

The widening unit 30 overlaps the predicted contour with the current contour, detects coincidence portions, wherein the coincidence potion is a portion of the current contour where the predicted contour overlaps with the current contour, and determines coincidence vertices. If the coincidence portion contains more than one pixel, end points of the coincidence portion are determined as the coincidence vertices. If the coincidence portion contains only one pixel, the very pixel is determined as the coincidence vertex.

Figure 3:
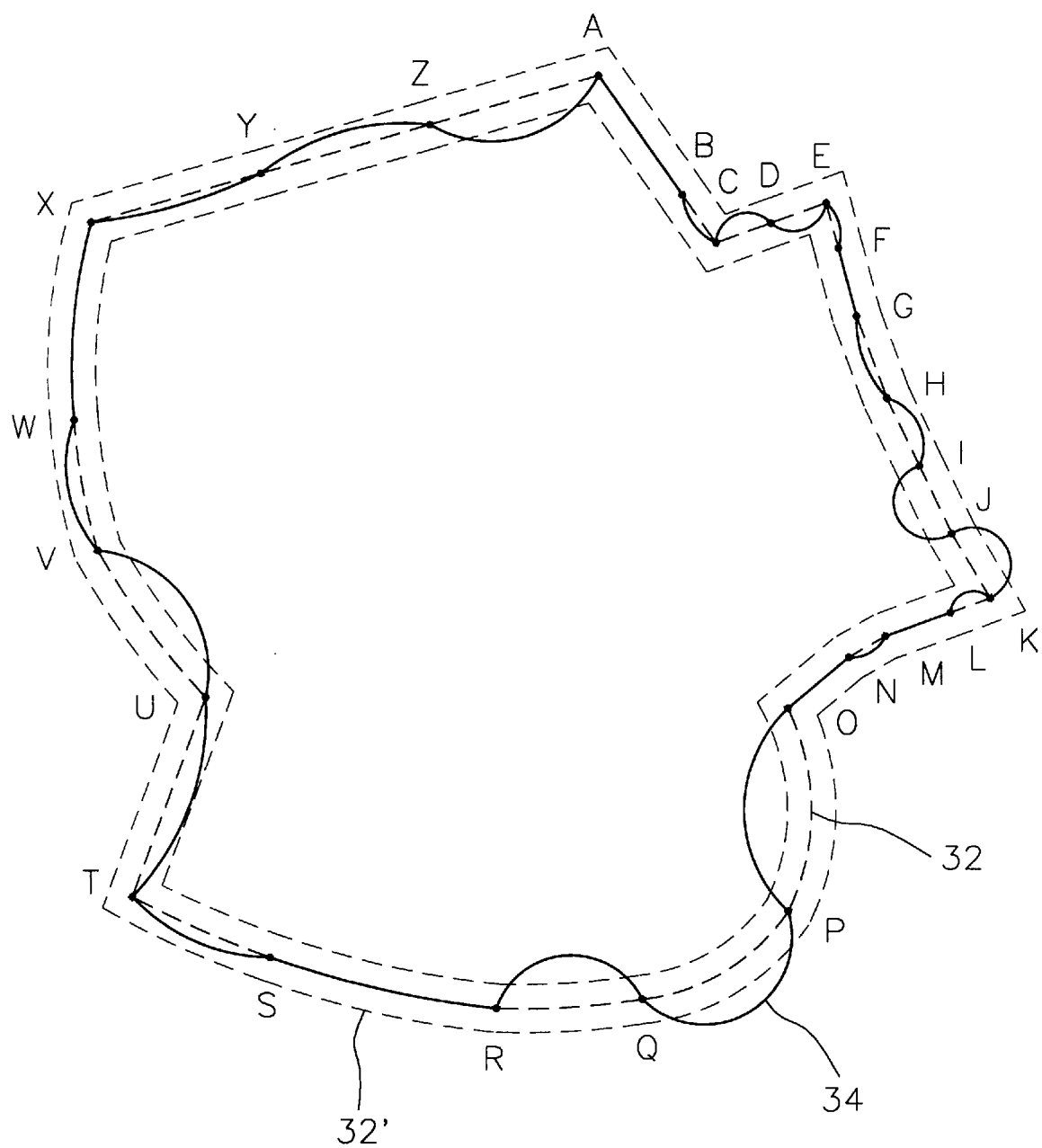
FIG. 3 depicts a process for matching a current contour with a predicted contour and widening the predicted contour by a predetermined threshold.

Referring to FIG. 3, 26 exemplary coincidence vertices A to Z are generated. A, B, F, G, L, M, N, 0, R, S, W, and X are the exemplary coincidence vertices, each being an end point of a corresponding exemplary coincidence portion, wherein each exemplary coincidence portion is a portion of an exemplary current contour 34 that overlaps with the exemplary predicted contour 32. C, D, E, H, I, J, K, P, Q, T, U, V, Y, and Z are the exemplary coincidence vertices at which the exemplary predicted contour 32 merely crosses the exemplary current contour 34.

After determining the coincidence vertices, the widening unit 30 widens the predicted contour by a predetermined threshold $D_{max}(j)$ to thereby generate a first widened contour band, wherein j is 0. $D_{max}(j)$ decreases as j increases, wherein $D_{max}(j)$ is nonnegative. In the preferred embodiment shown in FIG. 3, the exemplary predicted contour 32 is widened by $D_{max}(0)$, to thereby generate a first exemplary widened contour band 32'.

The widening unit 30 provides information on the current and predicted contours, the first widened contour band, and the coincidence vertices to a matched segment determination unit 40.

The matched segment determination unit 40 detects first matching portions. Each of the first matching portions represents a portion of the current contour overlapping with the first widened contour band between two coincidence vertices, and two adjacent first matching portions which have one end point in common are considered as one first matching portion.

Thereafter, the matched segment determination unit 40 compares each length of the first matching portions with a predetermined threshold TH, to thereby select first matching portions whose lengths are longer than the predetermined threshold TH as first matched segments. End points of the first matched segments are determined as first primary vertices. Referring to FIG. 3 again, portions from A to I, K to O, R to U, and V to Z are exemplary first matched segments of the exemplary current contour 34, and A, I, K, 0, R, U, V, and Z are exemplary first primary vertices of the exemplary current contour 34.

Information on the current and the predicted contours, and the first primary vertices is provided to a secondary vertex determination unit 50.

The secondary vertex determination unit 50 determines first unmatched segments, wherein the first unmatched segment is a segment on the current contour that does not belong to any of the first matched segments. Then, first secondary vertices are determined on each of the first unmatched segments on the current contour through the use of the conventional polygonal approximation technique based on the predetermined threshold $D_{max}(j)$, wherein the predetermined threshold $D_{max}(j)$ is the same threshold used at the widening unit 30. According to the conventional polygonal approximation technique, a contour pixel on any first unmatched segment which has a largest distance to a line segment corresponding thereto is determined as a first start vertex when the largest distance is greater than the $D_{max}(j)$. Those first start vertices determined by the polygonal approximation are defined as first secondary vertices.

Figure 4:
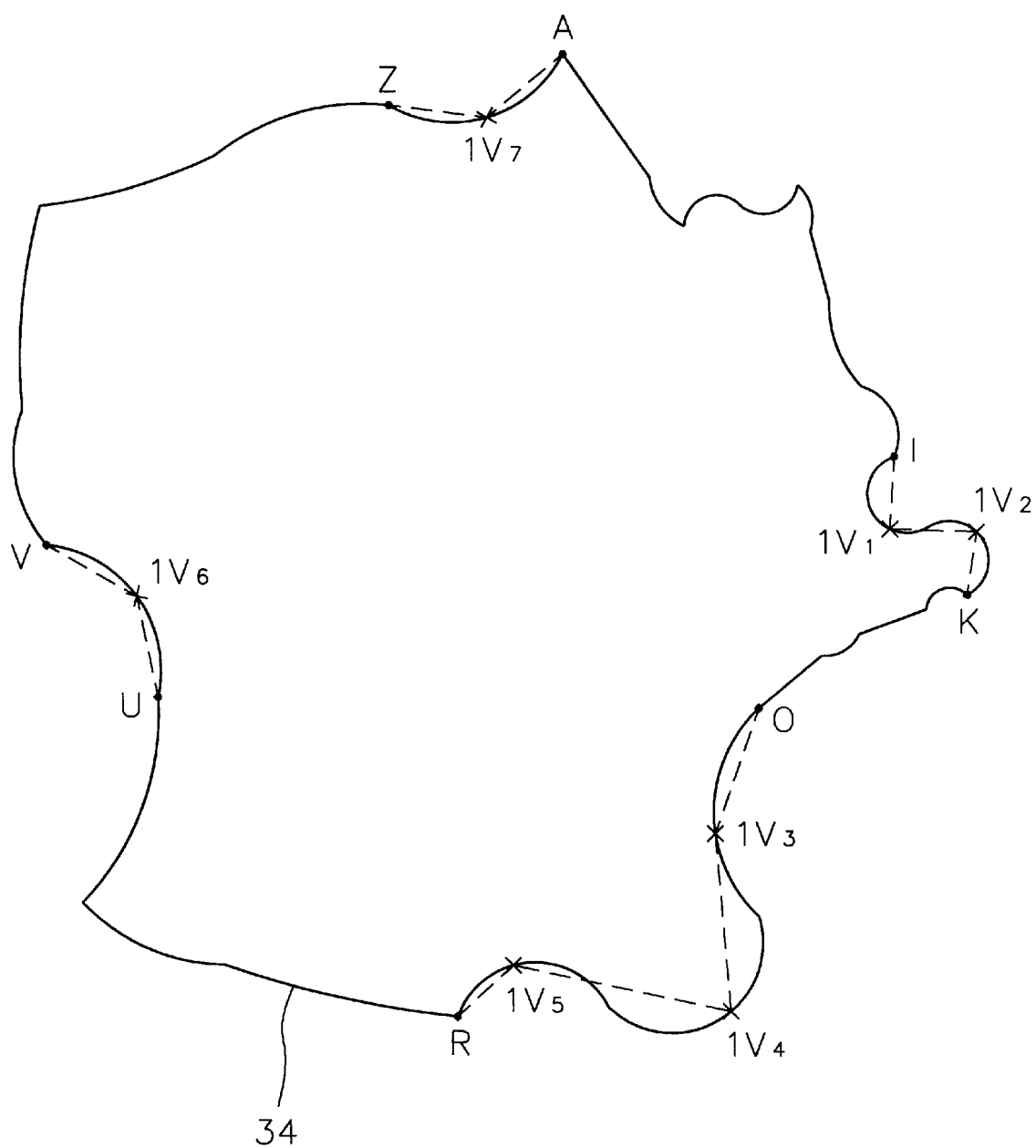
FIG. 4 describes a process for determining secondary vertices on unmatched segments.

Referring to FIG. 4, portions from I to K, O to R, U to V, and Z to A are exemplary first unmatched segments on the exemplary current contour 34, and $1V_1$ to $1V_7$ are exemplary first secondary vertices of the exemplary current contour 34.

The secondary vertex determination unit 50 provides information on the current and predicted contours, the first primary and the first secondary vertices, and the first matched and the first unmatched segments to an overlapped contour memory 60. The overlapped contour memory 60 gives indices to the first primary vertices to thereby store information on the first secondary and indexed first primary vertices as a first overlapped contour OC(1). For example, $1S_1$ indicates a first start point of the first matched segment, $1S_2$ indicates a second start point of the first matched segment, and so on, and $1E_1$ indicates a first end point of the first matched segment, $1E_2$ indicates a second end point of the first matched segment, and so on.

Figure 5:
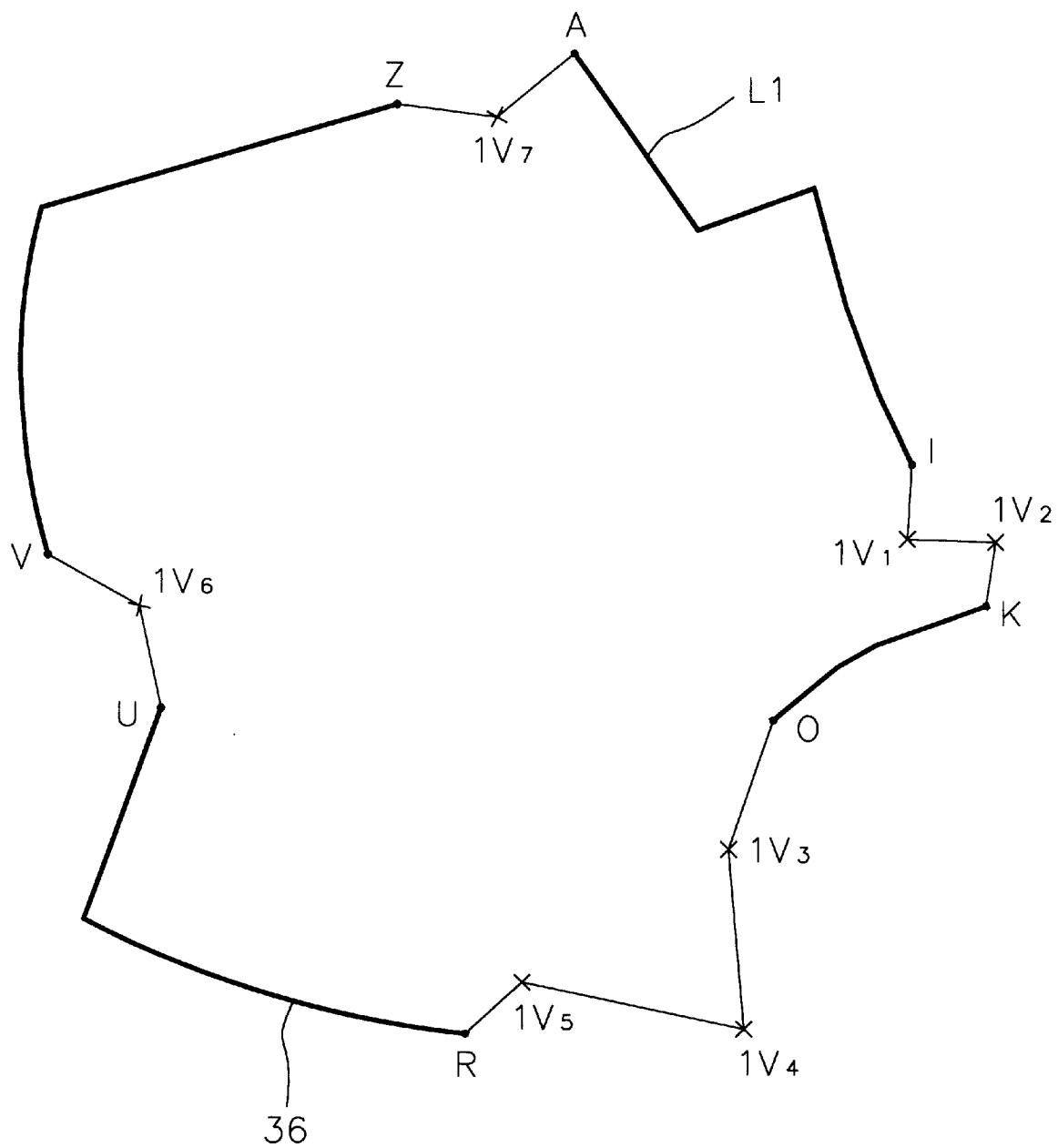
FIG. 5 provides an exemplary base layer reconstructed by using matched segments and the secondary vertices.

After storing the first overlapped contour OC(1), the overlapped contour memory 60 provides information on the first matched segment and the first secondary vertex on a line L40 to a base layer reconstruction unit 100 only when the value of j is 0. Then, the base layer reconstruction unit 100 reconstructs a current base layer. Referring to FIG. 5, an exemplary current base layer 36 comprises thick lines which are the exemplary first matched segments, and thin lines which connect two adjacent exemplary primary or secondary vertices. The reconstructed current base layer is stored in a base layer storage unit 110.

Meanwhile, the overlapped contour memory 60 increases j by 1 and provides information on the current and the predicted contours, and the first overlapped contour OC(1) to the widening unit 30 via a line L50.

The widening unit 30 widens the predicted contour from the overlapped contour memory 60 by a predetermined threshold $D_{max}(j)$ to thereby generate a second widened contour band, wherein j is 0 and $D_{max}(1)$ is smaller than $D_{max}(0)$. The widening unit 30 provides information on the current and the predicted contours, the second widened contour band, and the first overlapped contour OC(1) to the matched segment determination unit 40.

The operation of the matched segment determination unit 40 for the case when j is 1 is similar to that for the case when j is 0. That is, portions where the second widened contour band coincides with the current contour are determined as second matching portions. Thereafter the second matching portions whose lengths are longer than the predetermined threshold TH are determined as second matched segments and end points of the second matched segments are determined as second primary vertices.

Information on the current and the predicted contours, the second primary vertices, and the first overlapped contour OC(1) is provided to the secondary vertex determination unit 50.

The secondary vertex determination unit 50 determines second unmatched segments, wherein the second unmatched segment is a portion on the current contour between two adjacent points among the first primary vertices, the first secondary vertices and the second primary vertices that does not belong to any of the second matched segments.

Then, second secondary vertices are determined on each of the second unmatched segments on the current contour through the use of the conventional polygonal approximation technique based on the predetermined threshold $D_{max}(j)$, wherein the predetermined threshold $D_{max}(j)$ is the same threshold used at the widening unit 30. According to the conventional polygonal approximation technique, a contour pixel on any second unmatched segment which has a largest distance to a line segment corresponding thereto is determined as a second start vertex when the largest distance is greater than the predetermined threshold $D_{max}(j)$. Those second start vertices determined by the polygonal approximation are referred as second secondary vertices.

The secondary vertex determination unit 50 provides information on the current and the predicted contours, the second primary and the second secondary vertices, and the second matched and the second unmatched segments to the overlapped contour memory 60. The overlapped contour memory 60 gives indices to the second primary vertices to thereby store information on the second secondary and indexed second primary vertices as a second overlapped contour OC(2). For example, $2S_1$ indicates a first start point of the second matched segment, $2S_2$ indicates a second start point of the second matched segment, and so on, and $2E_1$ indicates a first end point of the second matched segment, $2E_2$ indicates a second end point of the second matched segment, and so on.

After storing the second overlapped contour OC(2), the overlapped contour memory 60 updates the first overlapped contour OC(1). In detail, there may be some first primary vertices which are not the second primary vertices. Thus, the overlapped contour memory 60 gives indices to such points, which indicates that the corresponding points are first start-end points. The first start-end points are the points which are the first primary vertices but not the second primary vertices. For example, $1SE_1$ indicates a first start-end point of the base layer, $1SE_2$ indicates a second start-end point of the base layer, and so on. An updated first overlapped contour OC'(1) is stored in the overlapped contour memory 60.

Figure 6A:
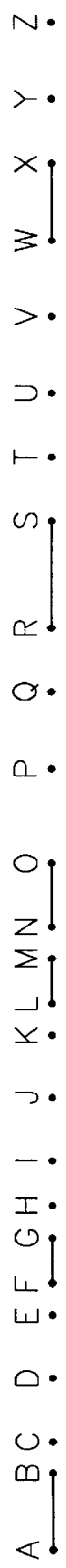
FIG. 6 offers the changing contour information as the operation preceeds in accordance with the present invention.
Figure 6B:
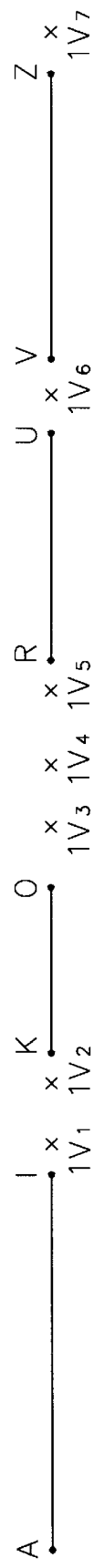
Figure 6C:
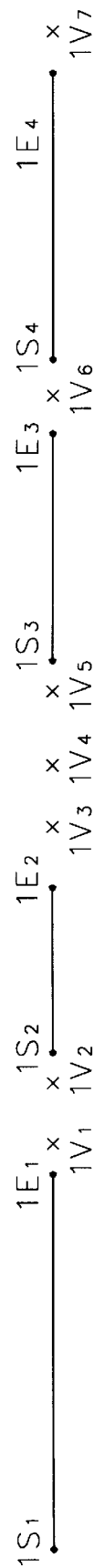
Figure 6G:
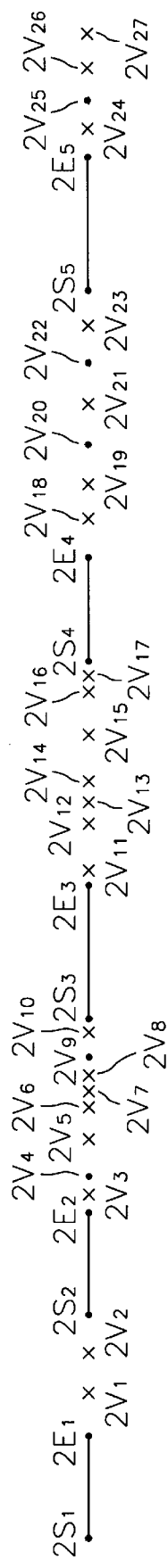
Figure 6H:
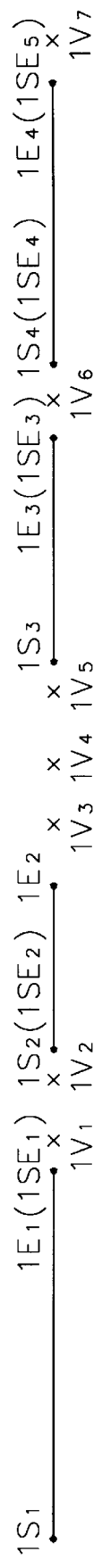

Referring to FIGS. 6A to 6H, there are diagrams each of which illustrates the changing contour information as the operation proceeds in accordance with the present invention. FIG. 6A depicts the exemplary coincidence vertices A to Z, and the exemplary coincidence portions AB, FG, LM, NO, RS and WX in accordance with the preferred embodiment of the present invention. FIG. 6B illustrates the exemplary first primary vertices A, I, K, O, R, U, V and Z, the exemplary first secondary vertices $1V_1$ to $1V_7$, and the exemplary first matched segments AI, LO, RU and VZ resulted from the construction of the exemplary current base layer. FIG. 6C is an exemplary first overlapped contour OC(1) stored in the overlapped contour memory 60 when j is 0, and $1S_1$ to $1S_4$ are exemplary start points of the exemplary first matched segments and $1E_1$ to $1E_4$ are exemplary end points of the exemplary first matched segments. FIG. 6D represents exemplary second primary vertices A, C, E, H, L, O, R, S, W and Y, and exemplary second matched segments AC, EH, LO, RS and WY as the result of the contour widening by $D_{max}(1)$. FIG. 6E shows exemplary second unmatched segments CE, HI, $I1V_1$, $1V_11V_2$, $1V_2K$, KL, $O1V_3$, $1V_31V_4$, $1V_41V_5$, $1V_5R$, SU, $U1V_6$, $1V_6V$, VW, YZ, $Z1V_7$ and $1V_7A$. FIG. 6F illustrates exemplary second secondary vertices $2V_1$ to $2V_{15}$. FIG. 6G is an exemplary second overlapped contour OC(2) stored in the overlapped contour memory 60 when j is 1, and $2S_1$ to $2S_5$ are exemplary start points of the exemplary second matched segments, and $2E_1$ to $2E_5$ is exemplary end points of the exemplary second matched segments. FIG. 6H is an exemplary first updated overlapped contour OC'(1) stored in the overlapped contour memory 60 when j is 1.

Meanwhile, the overlapped contour memory 60 provides information on the predicted contour and the first primary vertices to a primary vertex coding unit 70 via a line L60, information on the first secondary vertices and the updated first overlapped contour OC'(1) to a secondary vertex coding unit 80 via a line L70. Since, however, j is 1, the overlapped contour memory 60 does not provide the information on the first matched segment and the first secondary vertex to the base layer reconstruction unit 100 via the line L40.

The primary vertex coding unit 70 determines a reference point RP, by using a predetermined method, for example, raster scanning, calculates length of each segment between two adjacent first primary vertices, and encodes information on the first primary vertices by using the Reference Contour Based coding method in a predetermined direction, for instance, clockwise. In accordance with a preferred embodiment of the present invention, the number of the pixels constituting each segment is defined as the length of each segment.

If the maximum length m is longer than or equal to $2^n$ and shorter than $2^{n+1}$, a first primary vertex next to RP is encoded by representing the length from RP to itself by using n bits. Thereafter, remaining vertices are encoded as follows: If the length from RP to a first primary vertex just decoded is longer than m, the next first primary vertex is encoded by representing the length from the first primary vertex just decoded to itself by using n bits. And if the length from RP to the first primary vertex just decoded is shorter than m, the next first primary vertex is encoded by representing the length from the first primary vertex just decoded to itself by using n' bits, wherein n' bit can afford to represent the length from the first primary vertex just decoded to RP.

Figure 7:
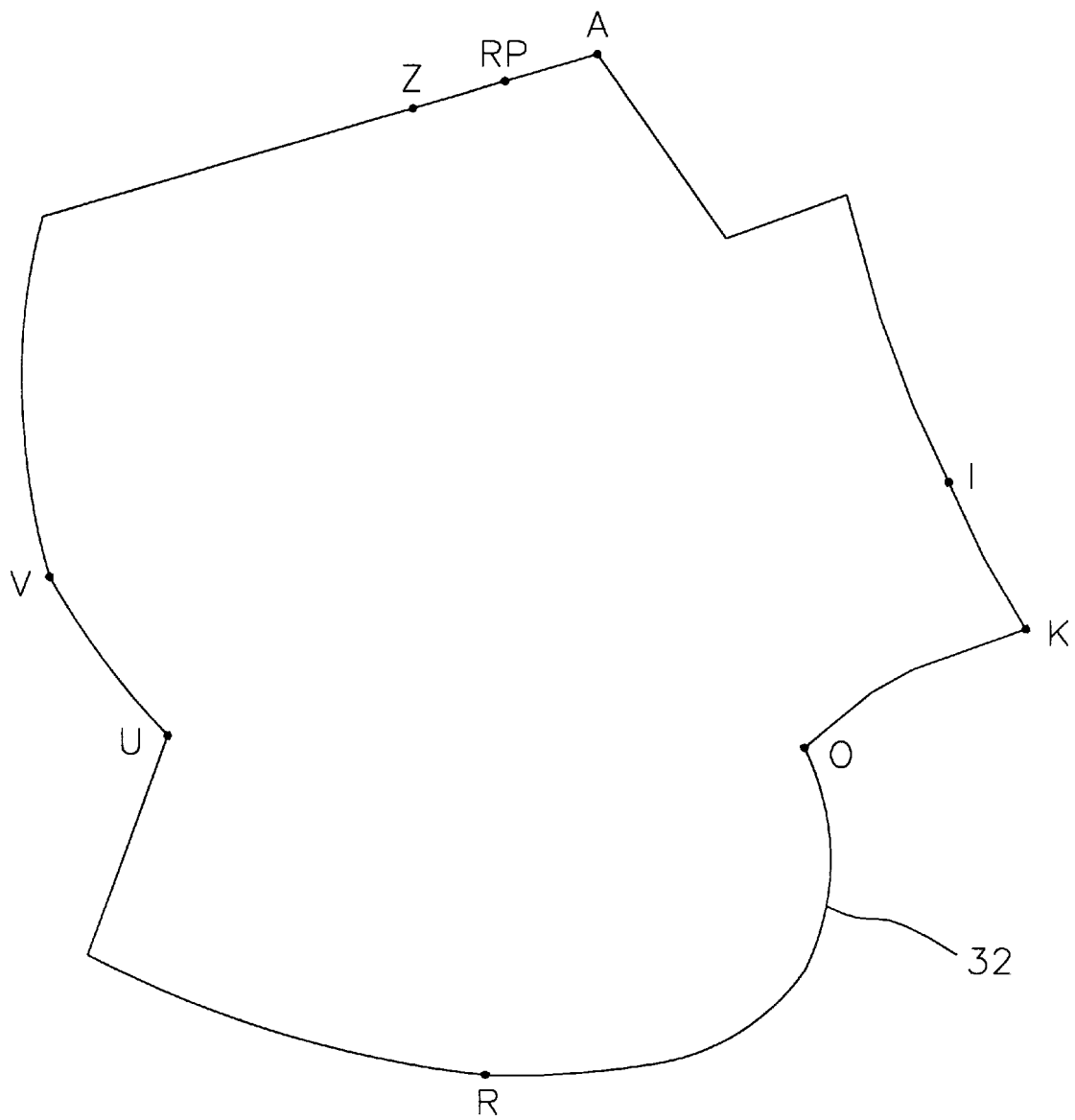
FIG. 7 represents a method for encoding information of the primary vertex through the Reference Contour Based Coding technique.

Referring to FIG. 7, the length of the segment AI, namely, m1 which is longer than or equal to $2^{n1}$ and shorter than $2^{n1+1}$ is longest, the length from U to is longer than m1 and the length from V to RP is shorter than m1. The exemplary first primary vertices A to U are encoded by representing the length between two adjacent exemplary first primary vertices by using n1 bits, V is encoded by representing the length from U to V by using n1' bits which can afford to represent the length from U to RP, and Z is encoded by representing the length from V to Z by using n1" bits which can afford to represent the length from V to RP.

Meanwhile, the secondary vertex encoding unit 80 encodes the first secondary vertices. Each of the first secondary vertices is encoded by representing a 2 dimensional displacement from a closest first primary or secondary vertex located counterclockwise to itself. In the preferred embodiment of the present invention shown in FIG. 4, $1V_1$ is encoded by representing the displacement from I to $1V_1$, $1V_2$ is encoded by representing the displacement from $1V_1$ to $1V_2$, and $1V_3$ is encoded by representing the displacement from O to $1V_3$, and so on.

Encoded information on the first primary and secondary vertices is provided to the formatter 90.

The formatter 90 formats the encoded information on the first primary and secondary vertices in a predetermined way based on the updated first overlapped contour OC'(1). That is, the formatter 90 formats the encoded information in the order of the motion vector MV, the number of the primary vertices, the number of the start-end points among the primary vertices, numbers indicating the start-end points, the numbers of the secondary vertices between the unmatched segments, the encoded primary and secondary vertex information, to thereby provide it to a transmitter(not shown).

In the case of the exemplary current base layer 36 shown in FIG. 5, formatted current base layer information is MV, 8, 3, 2, 6, 8, 2, 3, 1, 1, A, I, K, O, R, U, V, Z, 2, 6, 8, $1V_1$, $1V_2$, $1V_3$, $1V_4$, $1V_5$, $1V_6$, $1V_7$.

A decoder(not shown) can restore the current base layer by decoding formatted information and by using the previous base layer decoded before.

While the present invention has been described with respect to certain preferred embodiments only, other modifications and variations may be made without departing from the spirit and scope of the present invention as set forth in the following claims.

What is claimed is:

1. A method for scalably inter-contour coding a video signal including a previous frame and a current frame, wherein each of the previous and the current frame contains a contour, the method comprising the steps of:

(a) generating a predicted contour by motion estimating and compensating a previous base layer;

(b) widening the predicted contour by a predetermined threshold $D_{max}(j)$, generating (j)th primary and secondary vertices to thereby store them as (j)th layer information, j being 0, and reconstructing a current base layer;

(c) widening the predicted contour by a predetermined threshold $D_{max}(j+1)$, generating (j+1)st primary and secondary vertices to thereby store them as (j+1)st layer information, and updating the (j)th layer information by using the (j+1)st layer information;

(d) encoding the (j)th primary and secondary vertices of the (j)th layer information;

(e) formatting the encoded (j)th primary and secondary vertex information in a predetermined way; and (f) increasing j by 1, and repeating steps (c) to (e) until j becomes N, N being a positive integer, wherein said step (b) includes the steps of:

(b1) detecting coincidence vertices, wherein each of the coincidence vertices is a crossing point between the predicted contour and the current contour or an end point of a portion where the predicted contour overlaps with the current contour;

(b2) widening the predicted contour by the predetermined threshold $D_{max}(j)$ to thereby generate a (j)th widened contour band, and detecting (j)th matching portions where the current contour overlaps with the (j)th widened contour band between two of the coincidence vertices determined at step (b1), wherein j is 0;

(b3) determining the (j)th matching portions whose lengths are longer than or equal to a predetermined nonnegative threshold TH as (j)th matched segments, and determining end points of the (j)th matched segments as the (j)th primary vertices;

(b4) determining portions on the current contour which do not belong to any of the (j)th matched segments as the (j)th unmatched segments, determining the (j)th secondary vertices by applying a polygonal approximation method, based on the predetermined threshold $D_{max}(j)$, to the (j)th unmatched segments, and storing the (j)th primary and secondary vertices as the (j)th layer information; and (b5) reconstructing the current base layer by using the (j)th matched segments and the (j)th secondary vertices, and storing the current base layer, and said step (d) includes the steps of:

(d1) calculating lengths of all the segments, each of which connects two adjacent (j)th primary vertices, and determining a maximum length m, wherein m is greater than or equal to $2^n$ and smaller than $2^{n+1}$;

(d2) encoding a (j)th primary vertex adjacent to a reference point RP in a predetermined direction by representing the length from RP to the (j)th primary vertex to be encoded by using n bits, encoding a next (j)th primary vertex by representing the length from the (j)th primary vertex just encoded to the (j)th primary vertex to be encoded by using n bits if d is greater than m, and encoding the next (j)th primary vertices by representing the length by using s bits otherwise, wherein d is the length from RP to the (j)th primary vertex just encoded, and d is greater than or equal to $2^s$ and smaller than $2^{s+1}$; and (d3) encoding each of the (j)th secondary vertices by representing a 2 dimensional displacement from the closest (j)th primary of secondary vertex located in a predetermined direction to the (j)th secondary vertex to be encoded.

2. The method according to claim 1, wherein said step (a) includes the steps of:

(a1) displacing the previous base layer on a pixel-by-pixel basis, and counting the number of pixels which belong to both the previous base layer and the current contour at each displacement;

(a2) determining a displacement, where the number of the pixels which belong to both the previous base layer and the current contour is maximum, as a motion vector; and (a3) generating the predicted contour by moving the previous base layer by the motion vector to thereby overlap it with the current contour.

3. The method according to claim 1, wherein said step (c) includes the steps of:

(c1) widening the predicted contour by the predetermined threshold $D_{max}(j+1)$ to thereby generate a (j+1)st widened contour band, detecting (j+1)st matching portions where the current contour overlaps with the (j+1)st widened contour band between two of the coincidence vertices determined at step (b1);

(c2) determining the (j+1)st matching portions whose lengths are longer than or equal to the predetermined nonnegative threshold TH as (j+1)st matched segments, and determining end points of the (j+1)st matched segments as the (j+1)st primary vertices;

(c3) determining portions on the current contour between two adjacent points among the (j)th primary vertices, the (j)th secondary vertices and the (j+1)st primary vertices which do not belong to any of the (j+1)st matched segments as (j+1)st unmatched segments, and determining the (j+1)st secondary vertices by applying the polygonal approximation method based on the predetermined threshold $D_{max}(j+1)$ to the (j+1)st unmatched segments, and storing the primary and secondary vertices as the (j+1)st layer information; and (c4) selecting the (j)th primary vertices which are not the (j+1)st primary vertices as SE points, and updating the (j)th layer information by adding the SE point information.

4. The method according to claim 1, wherein the predetermined threshold $D_{max}(j+1)$ is smaller than the predetermined threshold $D_{max}(j)$.

5. The method according to claim 1, wherein said step (e) formats the (j)th layer information in the order of the motion vector, the number of the (j)th primary vertices, the number of the SE points among the (j)th primary vertices, numbers indicating the SE points, the number of the (j)th secondary vertices on each of the (j)th unmatched segments, and the encoded (j)th primary and secondary vertex information.

6. An apparatus for scalably inter-contour coding a video signal including a previous frame and a current frame, wherein each of the previous frame and the current frame contains a contour, the apparatus comprising:

means for generating a predicted contour by motion estimating and compensating a previous base layer;

a vertex determining means for widening the predicted contour by a predetermined threshold $D_{max}(j)$, generating (j)th primary and secondary vertices, j ranging from 0 to N, N being a positive integer;

means for storing (j)th layer information;

means for reconstructing a current base layer, when j is 0;

means for encoding the (j)th primary and secondary vertices of the (j)th layer information; and means for formatting the encoded (j)th primary and secondary vertex information in a predetermined way, wherein the vertex determining means includes:

a matching means for detecting coincidence vertices, wherein each of the coincidence vertices is a crossing point between the predicted contour and the current contour or an end point of a portion where the predicted contour overlaps with the current contour;

means for widening the predicted contour by the predetermined threshold $D_{max}(j)$ to thereby generate a (j)th widened contour band and detecting (j)th matching portions where the current contour overlaps with the (j)th widened contour band between two of the coincidence vertices determined at the matching means;

a primary vertex determining means for determining the (j)th matching portions whose lengths are longer than or equal to a predetermined nonnegative threshold TH as (j)th matched segments, and determining end points of the (j)th matched segments as the (j)th primary vertices; and a secondary vertex determining means for determining portions on the current contour which do not belong to any of the (j)th matched segment as the (j)th unmatched segments, determining the (j)th secondary vertices by applying a polygonal approximation method based on the predetermined threshold $D_{max}(j)$, to the (j)th unmatched segments, and storing the (j)th primary and secondary vertices as the (j)th layer information, and the encoding means includes:

means for calculating lengths of all the segments, each of which connects two adjacent (j)th primary vertices, and determining a maximum length m, wherein m is greater than or equal to $2^n$ and smaller than $2^{n+1}$;

a primary vertex encoding means for encoding the (j)th primary vertex adjacent to a reference point RP in a predetermined direction by representing the length from RP to the (j)th primary vertex to be encoded by using n bits, encoding a next (j)th primary vertex by representing the length from the (j)th primary vertex just encoded to the (j)th primary vertex to be encoded by using n bits if d is greater than m, and encoding the next (j)th primary vertex by representing the length by using s bits otherwise, wherein d is the length from RP to the (j)th primary vertex just encoded, and d is greater than or equal to $2^s$ and smaller than $2^{s+1}$; and a secondary vertex encoding means for encoding each of the (j)th secondary vertices by representing a 2 dimensional displacement from the closest (j)th primary or secondary vertex located in a predetermined direction to the (j)th secondary vertex to be encoded.

7. The apparatus according to claim 6, wherein the predicted contour generating means includes:

a motion estimating means for displacing the previous base layer on a pixel-by-pixel basis, counting a number of pixels which belong to both the previous base layer and the current contour at each displacement, determining a displacement, where the number of the pixels which belong to both the previous base layer and the current contour is maximum as a motion vector; and a motion compensating means for generating the predicted contour by moving the previous base layer by the motion vector to thereby overlap it with the current contour.

8. The apparatus according to claim 6, wherein the (j)th layer information storing means, after storing information on the (j)th primary and secondary vertices, increases the value of j by 1 to thereby repeat the operation of the vertex determining means until j becomes N.

9. The apparatus according to claim 6, wherein the current base layer reconstructing means includes:

a current base layer generating means for reconstructing the current base layer by using the (j)th matched segments and the (j)th secondary vertices, when j is 0; and a current base layer storing means for storing the current base layer.

10. The apparatus according to claim 6, wherein the predetermined threshold $D_{max}(j)$ decreases as j increases.

11. The method according to claim 6, wherein the formatting means formats the (j)th layer information in the order of the motion vector, the number of the (j)th primary vertices of the (j)th layer, the number of the SE points among the (j)th primary vertices, numbers indicating the SE points, the number of the (j)th secondary vertices on the (j)th unmatched segments, and the encoded (j)th primary and secondary vertex information.

* * * * *